United States Patent
Goss

[11] Patent Number: 5,987,733
[45] Date of Patent: Nov. 23, 1999

[54] METHOD OF MAKING A FLEXURE VERTICAL MOTION STOP

[75] Inventor: Lloyd C. Goss, Bloomington, Minn.

[73] Assignee: Hutchinson Technology, Inc., Hutchinson, Minn.

[21] Appl. No.: 09/023,684

[22] Filed: Feb. 13, 1998

Related U.S. Application Data

[60] Continuation of application No. 08/488,119, Jun. 7, 1995, abandoned, which is a division of application No. 08/173,685, Dec. 23, 1993, abandoned.

[51] Int. Cl.$^6$ ................................................ G11B 5/42
[52] U.S. Cl. ........................ 29/603.03; 360/103; 360/104
[58] Field of Search ............................ 29/603.04, 603.05, 29/603.06, 603.03; 360/103, 104

[56] References Cited

U.S. PATENT DOCUMENTS

| | | |
|---|---|---|
| 5,243,482 | 9/1993 | Yamaguvhi et al. . |
| 5,570,249 | 10/1996 | Aoyagi et al. . |
| 5,781,381 | 7/1998 | Koganezawa et al. . |
| 5,808,837 | 9/1998 | Norton . |
| 5,877,920 | 3/1999 | Resh . |

FOREIGN PATENT DOCUMENTS

| | | |
|---|---|---|
| 1-107384 | 4/1989 | Japan . |
| 9-282823 | 10/1997 | Japan . |
| 10-55636 | 2/1998 | Japan . |
| 10-69743 | 3/1998 | Japan . |
| 10-69745 | 3/1998 | Japan . |
| 10-143962 | 5/1998 | Japan . |
| 10-208415 | 8/1998 | Japan . |
| 10-241310 | 9/1998 | Japan . |
| 10-261249 | 9/1998 | Japan . |
| 10-269734 | 10/1998 | Japan . |
| 10-269735 | 10/1998 | Japan . |
| WO 97/43757 | 11/1997 | WIPO . |
| WO 98/54669 | 12/1998 | WIPO . |

*Primary Examiner*—Carl E. Hall
*Attorney, Agent, or Firm*—Faegre & Benson LLP

[57] ABSTRACT

A head suspension assembly includes a load beam, a flexure and a constraint structure for limiting range of motion of the flexure tongue. The constraint structure directly engages a free end of the flexure tongue to restrict the range of motion of the free end of the flexure tongue. This constraint structure is on the disk-confronting surface of the load beam to overlap the proximal end of the flexure tongue. The constraint structure may be formed in one piece with a proximal extension of the flexure.

A method for manufacturing a head suspension assembly of the type including a load beam and a flexure, includes a step of incorporating into the suspension assembly a constraint structure for directly engaging the free end of the flexure tongue to restrict the range of motion of the flexure tongue. Preferably, the method includes shaping the constraint structure from the flexure itself, and bending the constraint structure, so that the distal limit of the constraint extends directly over and is spaced from the free end of the tongue, between the tongue and its associated disk surface.

9 Claims, 4 Drawing Sheets

METHOD OF MAKING A FLEXURE VERTICAL MOTION STOP

The present application is a continuation of application Ser. No. 08/488,119 filed Jun. 7, 1995, now abandoned, which is a divisional of application Ser. No. 08/173,685 filed Dec. 23, 1993, now abandoned.

FIELD OF THE INVENTION

The invention relates to a head suspension assembly which includes a motion constraint for limiting the range of motion of a flexure tongue in a head suspension assembly. More particularly, this motion constraint limits the range of vertical motion of the flexure by directly engaging the flexure tongue in order to prevent shock and damage to the flexure, to the head slider and/or to the disk, especially when the disk drive, of which the head suspension assembly is a constituent part, is subjected to physical shock or to rough handling.

BACKGROUND OF THE INVENTION

Standard head suspension assemblies (HSAs) include, as component elements, a base plate, a load beam, a gimballing flexure and a head slider. The base plate is attached to a proximal end of the load beam, and is configured for mounting the load beam to an actuator arm of a disk drive. The flexure is positioned on a distal end of the load beam.

A style of flexure, sometimes referred to as a "T-type" or a Watrous gimballing flexure, generally includes a pair of outer flexible arms about a central aperture with a cross piece extending across and connecting the arms at a distal end of the flexure. A flexure tongue is joined to the cross piece, offset toward the attached head slider, and extends from the cross piece into the aperture. A free end of the tongue is centrally located between the flexible arms. Mounted to the free end of the flexure tongue is a head slider. The head slider must be mounted to the flexure tongue so that the head slider is in a predetermined (e.g., planar and parallel) relationship to the confronting disk surface.

Hutchinson Technology Inc. (HTI), assignee of the present invention, makes commercially available a suspension assembly, identified as the Type 13, which uses a style of flexure described above as a "T-type" or Watrous flexure. The Type 13 flexure, as is conventional with a "T-type" or Watrous flexure, is attached to a distal end of the head slider. When the disk drive using this style of flexure is moved, as in shipping or handling, or is subjected to high shock impacts, as in jarring or dropping, the head slider leaves the disk under a high "G" shock load. Recent testing has shown that, during an initial shock impact to the disk drive, the read-write head remains relatively stable with the suspension during movement away from the disk. Upon returning to the disk from this initial impact, the head strikes the disk at a relatively flat angle. When the suspension and the head rebound after this first excursion away from and .back to the disk, the suspension pulls away from the disk, pulling away the head at the end by which the head is attached to the slider. The suspension and the head are thus disoriented or dislocated from their pre-set parallel planar synchronization. The head now strikes the disk at a sharp angle upon returning to the disk surface. This sharp angle striking continues on future excursions of the suspension and head away from and back to the disk surface. These repeated sudden impacts at a sharp angle continue to damage the disk, the head slider, and/or the flexure.

It is thus desirable to reduce or eliminate the possibility of damage to the flexure, to the head slider, or to the disk by constraining or limiting the range of motion, particularly vertical motion, of the flexure relative to the load beam. Certain devices have previously been proposed to limit the range of flexure motion.

U.S. Pat. No. 4,939,611, Connolly, issued Jul. 3, 1990 and entitled VERTICAL DISPLACEMENT LIMIT STOP IN A DISK DRIVE FOR PREVENTING DISK SURFACE DAMAGE, describes a member on a comb structure of either a rotary or linear actuator for limiting vertical displacement of an arm with a confronting disk surface, such as when the disk drive is being handled for removal, installation or transportation. These vertical displacement stops are located outside of tracks recorded on the disk, so that they do not interfere with the function of any disk drive parts during periods of normal operation. However, this displacement stop is designed for use only during non-operational periods and does not provide protection to limit flexure motion when the disk drive is in normal operation.

U.S. Pat. No. 4,724,500, Dalziel, issued Feb. 9, 1988 and entitled MECHANISM FOR PREVENTING SHOCK DAMAGE TO HEAD SLIDER ASSEMBLIES AND DISKS IN RIGID DISK DRIVE, describes an elongated constraint element positioned on the side of the load beam opposite the flexure, in association with a pair of wing elements attached to shoulder extensions of the head slider. The constraint element and the wing elements, together with the specially configured head slider, serve to limit the range of motion, both vertical and rotational, of the flexure tongue. The Dalziel structure is rather complicated, adding significantly to the weight, height and difficulty of manufacture and assembly of the suspension.

Accordingly, there continues to be a need to limit the range of motion of the flexure tongue and the attached head slider relative to the load beam under both operational and non-operational drive modes, without unduly adding to the structure of the suspension assembly.

SUMMARY OF THE INVENTION

The head suspension assembly according to the present invention includes a load beam, a flexure and a constraint structure for limiting the range of motion of the tongue of the flexure relative to the load beam. The load beam has a proximal and a distal end. The flexure has a pair of outer arms supporting the tongue between the arms, and the flexure is on the load beam distal end. The flexure tongue supports a head slider in confronting relationship to an associated disk surface. The constraint structure directly engages a free end of the tongue on the disk-confronting side of the flexure tongue to restrict or limit the range of motion of the free end of the tongue relative to the load beam. The constraint structure may be formed in one piece with a proximal extension of the flexure or may be a separate element of the head suspension assembly. A constraint structure of this invention may also be used with a one-piece load beam and flexure structure and may be a separate element attached to the disk-confronting surface of the load beam or may be shaped from the surface of the load beam itself to overlap the proximal end of the flexure tongue.

This invention includes a method for manufacturing a head suspension assembly of the type including a load beam and a flexure, wherein the method includes a step of incorporating into the suspension assembly a constraint structure for directly engaging the free end of the tongue to restrict the range of flexure of the tongue. Preferably, the method includes shaping the constraint structure from the flexure itself, and bending the constraint structure, so that the distal limit of the constraint extends directly over and is spaced from the free end of the tongue.

DETAILED DESCRIPTION OF THE INVENTION

Figure 1:
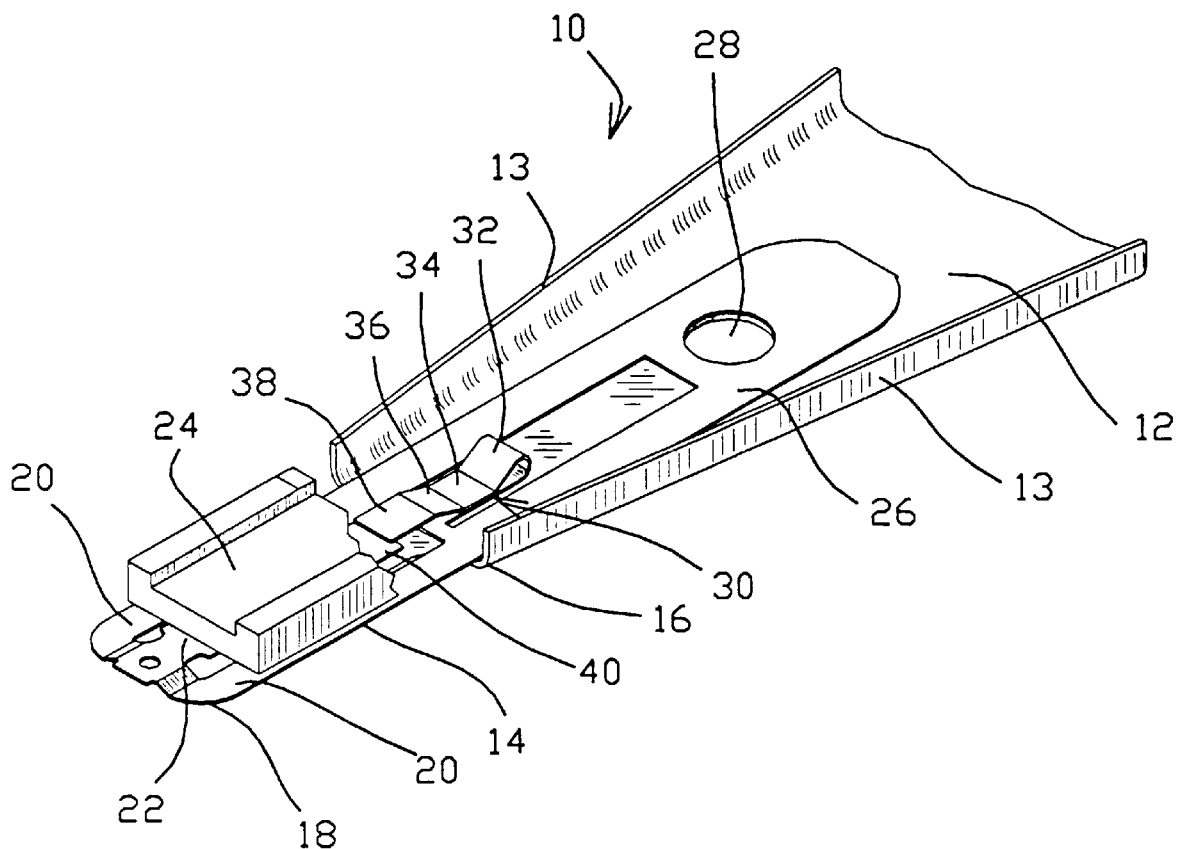
FIG. 1 is a perspective view of a flexure motion constraint according to the present invention formed from the flexure.

FIG. 1 illustrates a head suspension assembly 10 of the present invention, showing a load beam 12 having perimeter stiffening rails 13 with a flexure 14 positioned at the distal end 16 of the load beam 12. The distal end 18 of the flexure 14 has an outer pair of arms 20 supporting a flexure tongue 22 between the arms 20. The flexure tongue 22 is offset from the flexure 14 toward the attached head slider 24. The proximal extension 26 of the flexure 14 is attached to the load beam 12 by welding or adhesive bonding. Aperture 28 is matched to a corresponding aperture on the load beam 12 in suspension alignment.

Constraint structure 30 is etched or otherwise cut from the proximal extension 26, and is then curved into first section 32, which is oriented distally toward the flexure tongue 22, and bent into second section 34, which is co-planar with the plane of proximal extension 26. The second section 34 may be attached to the load beam 12, as by adhesive or welding. The constraint structure 30 is further bent into third section 36, which slopes from the plane of the flexure 14 slightly beyond the plane of the offset flexure tongue 22, and bent into fourth section 38, which extends over and is spaced from the free end 40 of the flexure tongue 22. With the fourth section 38 of the constraint structure 30 thus positioned between the free end 40 of the flexure tongue 22 and the confronting disk surface (not shown), the constraint structure 30 is able to limit the range of vertical movement of the flexure tongue 22 with respect to the load beam 12.

The constraint structure 30 may be positioned with the tip end (fourth section 38) of the constraint 30 approximately 25 to 250 micrometers from the flexure tongue 22 (as measured toward the disk surface). When forces due to shock cause the head slider 24 to accelerate away from the disk surface, the constraint 30 restricts the head slider 24 motion to the gap spacing of approximately 25 to 250 micrometers. Note that in this position, the constraint 30 does not interfere with normal operation of the HSA assembly 10.

Figure 2:
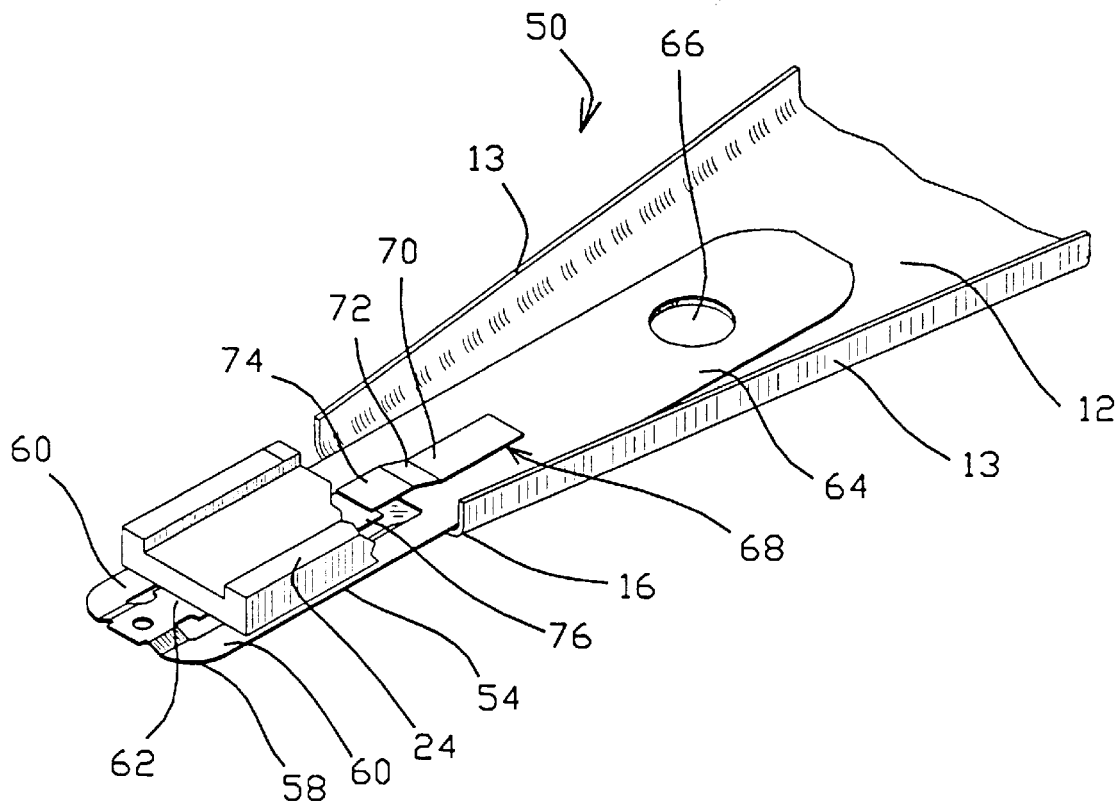
FIG. 2 is a view of another flexure motion constraint of the present invention formed as a separate element attached to the flexure.

The embodiment shown in FIG. 2, illustrates a head suspension assembly 50 of the present invention, showing a load beam 12 having perimeter stiffening rails 13 with a flexure 54 positioned at the distal end 16 of the load beam 12. The distal end 58 of the flexure 54 has an outer pair of arms 60 supporting a flexure tongue 62 between the arms 60. The flexure tongue 62 is offset from the flexure 54 toward the attached head slider 24. The flexure 54 is attached to the load beam 12 by the proximal extension 64 through welding or adhesive bonding. Aperture 66 is matched to a corresponding aperture on the load beam 12 in suspension alignment.

Separate constraint 68 is attached to the head slider 24 supporting surface of the flexure 54 by first section 70 through welding or adhesive bonding. Constraint 68 is bent into second section 72, which slopes from the plane of the flexure 54 slightly beyond the plane of the offset flexure tongue 62, and is bent into third section 74, which extends over and is spaced from the free end 76 of the flexure tongue 62. With the third section 74 of the constraint 68 thus positioned between the free end 76 of the flexure tongue 62 and the confronting disk surface, the constraint 68 is thus able to limit the range of vertical movement of the flexure tongue 62 with respect to the load beam 12.

Figure 3:
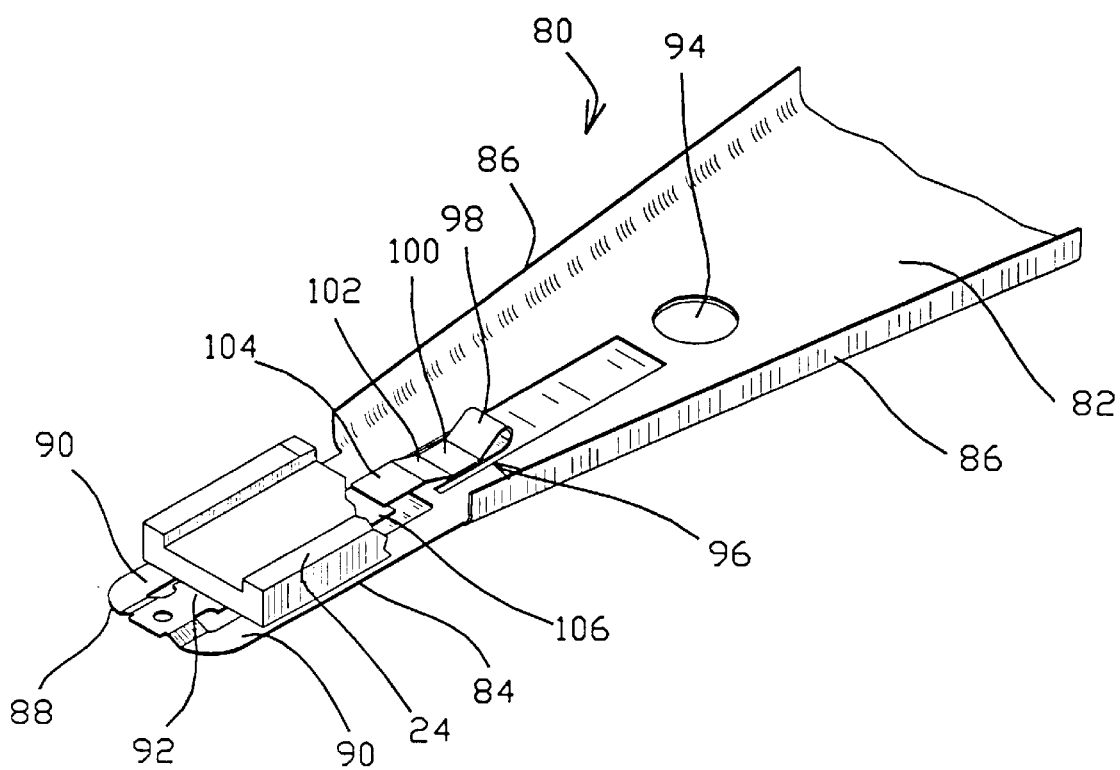
FIG. 3 is a view of a third flexure motion constraint of this invention in which the flexure is formed in one piece with the load beam and in which the flexure motion constraint is formed from the load beam, shown from the disk-confronting surface of the head suspension assembly.
Figure 4:
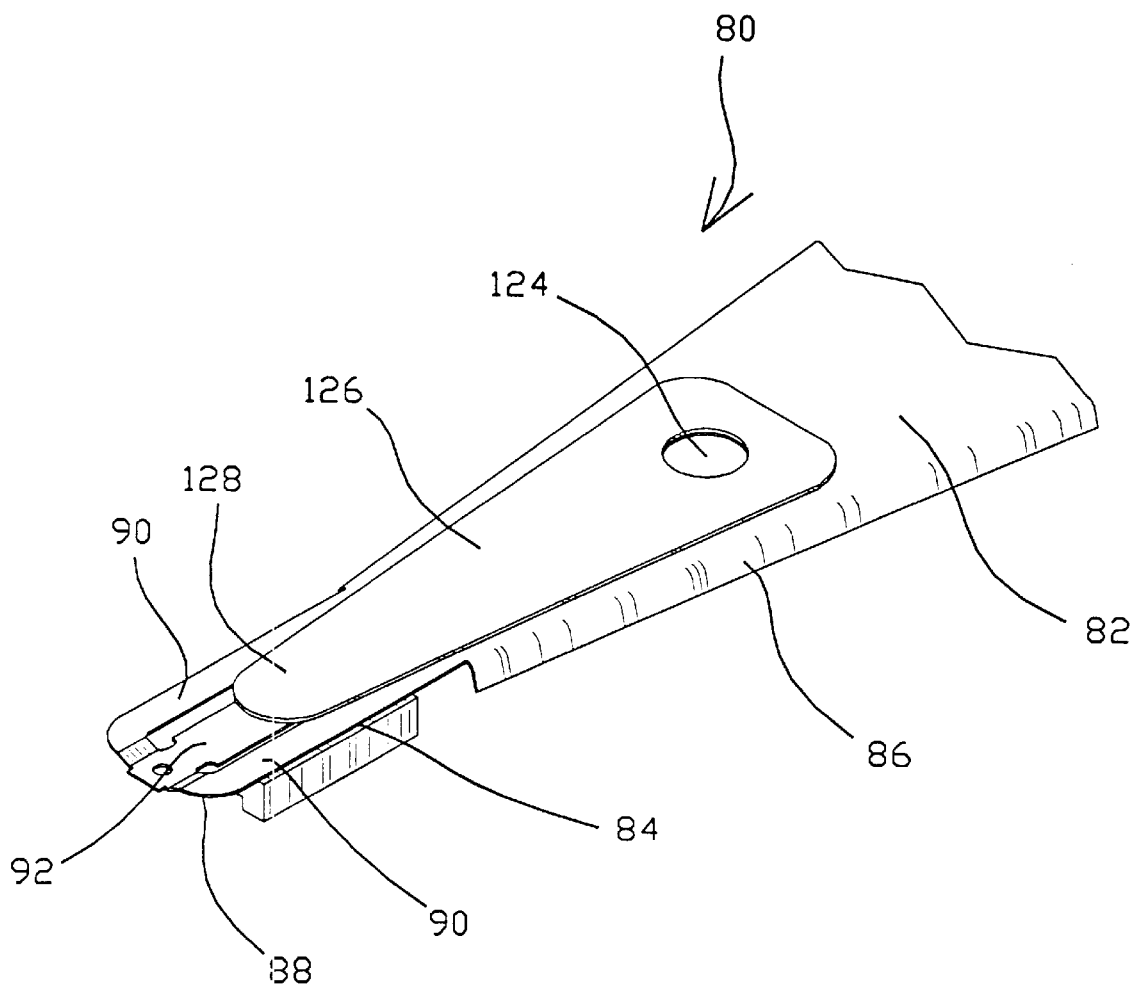
FIG. 4 is a view of the opposite surface of the head suspension assembly with the flexure motion constraint of FIG. 3.

The embodiment shown in FIGS. 3 and 4 illustrates a head suspension assembly 80 of the present invention, showing a unitary load beam 82 and flexure 84 structure having perimeter stiffening rails 86. FIG. 3 shows a disk-confronting surface of head suspension assembly 80 and FIG. 4 shows the opposite surface of head suspension assembly 80. The distal end 88 of the flexure 84 has an outer pair of arms 90 supporting a flexure tongue 92 between the arms 90. The flexure tongue 92 is offset from the flexure 84 toward the attached head slider 24. The flexure 84 is formed in one piece with the load beam 82. FIG. 4 illustrates a stiffener element 126. A dimple (not shown) on the flexure tongue 92 rides against the distal end 128 of the stiffener element 126 to provide a gram-load to the head slider 24. Aperture 94 in the load beam 82 is provided to align with aperture 124 on the stiffener element 126. Constraint structure 96 is etched or otherwise cut from the load beam 82, and is then curved into first section 98, which is oriented distally toward the flexure tongue 92, and bent into second section 100, which is co-planar with the plane of the load beam 82. The second section 100 may be attached to the load beam 82, as by adhesive or welding. The constraint structure 96 is further bent into third section 102, which slopes from the plane of the load beam 82 slightly beyond the plane of the offset flexure tongue 92, and bent into fourth section 104, which extends over and is spaced from the free end 106 of the flexure tongue 92. With the fourth section 104 of the constraint structure 96 thus positioned between the free end 106 of the flexure tongue 92 and the confronting disk surface (not shown), the constraint structure 96 is thus able to limit the range of vertical movement of the flexure tongue 92 with respect to the associated disk surface.

The constraint structure 96 may be positioned with the tip end (fourth section 104) of the constraint 96 approximately 25 to 250 micrometers from the flexure tongue 92 (as measured toward the disk surface). When forces due to shock cause the load beam 82 to deflect towards the disk surface and, then in rebounding, to pull the head slider 24 away from the disk surface, the constraint 96 restricts the head slider 24 motion to the gap spacing of approximately 25 to 250 micrometers. Note that in this position, the constraint 96 does not interfere with normal operation of the HSA assembly 80.

The constraint of this invention can readily be incorporated into existing head suspension assemblies to provide a much needed mechanism of great simplicity to reduce flexure, head slider and disk damages under shock loads during periods of normal disk drive operation.

What is claimed is:

1. A method for manufacturing a suspension assembly for supporting a head slider within a disk drive, the method including the steps of:

providing a load beam having a proximal and a distal end;

providing a flexure having a tongue with a free end;

providing constraint structure extending in a first direction from one of the flexure and the load beam and including an engagement surface; and mounting the flexure to the load beam with the engagement surface of the constraint structure positioned for defining a gap with the free end of the tongue and for directly engaging the free end of the tongue to restrict a range of flexure of the tongue in the first direction away from the load beam.

2. The method according to claim 1, wherein incorporating constraint structure includes incorporating a member having an end directly adjacent to and spaced from the free end of the tongue.

3. The method according to claim 2, wherein incorporating the constraint structure includes mounting the member to the suspension assembly.

4. The method according to claim 3, wherein mounting includes welding.

5. The method according to claim 3, wherein mounting includes adhesively bonding.

6. The method according to claim 2, wherein incorporating the constraint structure includes:

forming the member from the flexure; and bending the member so the end of the member extends directly over and is spaced from the free end of the tongue.

7. The method according to claim 6, wherein forming the member includes etching the member from the flexure.

8. The method according to claim 2, wherein forming the member includes:

fabricating the load beam;

fabricating the flexure including the tongue and an elongated strip adjacent the tongue;

bending the elongated strip of the flexure to form the member having the end of the member extending directly over and spaced from the free end of the tongue; and mounting the flexure to the load beam.

9. A method for manufacturing a suspension assembly for supporting a head slider within the disk drive, the method including the steps of providing a load beam having a proximal and a distal end; and including a flexure on the load beam distal end having a tongue with a free end, wherein the load beam and flexure together are a single one-piece element; and providing constraint structure extending in a first direction from the load beam and including an engagement surface positioned for defining a gap with the free end of the tongue and for directly engaging the free end of the tongue to restrict a range of flexure of the tongue in the first direction away from the load beam.

* * * * *